(12) United States Patent
Jia et al.

(10) Patent No.: US 12,377,979 B2
(45) Date of Patent: Aug. 5, 2025

(54) UNMANNED FOOD DELIVERY DEVICE IN CABIN AND APPLICATION METHOD THEREOF

(71) Applicant: SHANDONG UNIVERSITY OF SCIENCE AND TECHNOLOGY, Qingdao (CN)

(72) Inventors: Shun Jia, Qingdao (CN); Shang Wang, Qingdao (CN); Na Zhang, Qingdao (CN); Tianyou Hou, Qingdao (CN); Bo Yang, Qingdao (CN); Yang Liu, Qingdao (CN); Xiaoming Jie, Qingdao (CN); Hong Chen, Qingdao (CN); Xiangpeng Min, Qingdao (CN); Le Ma, Qingdao (CN); Yang Yang, Qingdao (CN); Shengshuai Su, Qingdao (CN); Jingyan Zhang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 685 days.

(21) Appl. No.: 17/840,313

(22) Filed: Jun. 14, 2022

(65) Prior Publication Data
US 2023/0009423 A1    Jan. 12, 2023

(30) Foreign Application Priority Data
Jul. 8, 2021    (CN) .......................... 202110776127.2

(51) Int. Cl.
*B64D 11/00*    (2006.01)

(52) U.S. Cl.
CPC ............................... *B64D 11/0007* (2013.01)

(58) Field of Classification Search
CPC ..... A47F 3/00; A47F 9/00; E04H 3/04; E01B 25/30; E01B 25/32; B60L 13/00;
(Continued)

(56) References Cited

U.S. PATENT DOCUMENTS

| 5,415,250 A * | 5/1995 | Rojas | B64D 11/0007 186/40 |
| 6,644,441 B1 * | 11/2003 | Ebrahimi | B64D 11/0007 186/40 |

(Continued)

*Primary Examiner* — Jeffrey A Shapiro
(74) *Attorney, Agent, or Firm* — Westbridge IP LLC

(57) ABSTRACT

Disclosed is an unmanned food delivery device in a cabin. The device comprises a first conveying mechanism, a second conveying mechanism and a loading and unloading mechanism. The first conveying mechanism comprises a universal conveyor belt, and the universal conveyor belt is driven by universal wheels to convey lunch boxes, and the universal conveyor belt is used for conveying lunch boxes in a kitchen area and a passenger area in a reciprocating manner; multiple second conveying mechanisms are respectively arranged on a luggage rack bottom plate in the passenger area, the luggage rack bottom plate is provided with multiple feeding openings respectively corresponding to seats at intervals, each second conveying mechanism is respectively positioned at the feeding openings, the second conveying mechanisms are connected with the first conveying mechanism and used for conveying lunch boxes by the first conveying mechanism to the seats.

4 Claims, 9 Drawing Sheets

(58) Field of Classification Search
CPC ......... B60L 13/006; B60L 13/06; B64D 9/00;
B64D 11/00; B64D 11/0007; B65G 7/20;
B65G 47/60; B65G 23/23; B65G 54/02;
F16G 13/00; F16G 13/02; F16G 13/04;
F16G 13/06; F16G 13/07; F16G 13/08;
F16G 13/10; F16G 13/12; F16G 15/00;
F16G 15/04
USPC ........... 186/38–51; 414/679; 104/89, 130.02,
104/281, 282, 284; 244/118.5, 137.1;
198/465.4, 485.1, 619; 187/269, 227,
187/289, 261; 59/78, 85; 296/22, 156,
296/178
See application file for complete search history.

(56) References Cited

U.S. PATENT DOCUMENTS

| | | | |
|---|---|---|---|
| 8,770,385 B2* | 7/2014 | Hannessen | B65G 47/57 |
| | | | 198/607 |
| 10,549,855 B2* | 2/2020 | Augustyniak | B64D 11/0007 |
| 10,640,289 B1* | 5/2020 | Roberts | B65G 47/5154 |
| 2008/0169171 A1* | 7/2008 | Itoh | B65G 13/10 |
| | | | 198/412 |
| 2016/0280474 A1* | 9/2016 | De Lama Arenales | |
| | | | B65G 47/086 |
| 2022/0402704 A1* | 12/2022 | Dörr | B65G 1/08 |

* cited by examiner the loading and unloading mechanism, arranged in the kitchen area and connected with the first conveying mechanism for loading or unloading the first conveying mechanism.

UNMANNED FOOD DELIVERY DEVICE IN CABIN AND APPLICATION METHOD THEREOF

CROSS-REFERENCE TO RELATED APPLICATIONS

This application claims priority to Chinese Patent Application No. 202110776127.2, filed on Jul. 8, 2021, the contents of which are hereby incorporated by reference.

TECHNICAL FIELD

The present application generally relates to the field of aviation service equipment, and in particular to an unmanned food delivery device in a cabin and an application method thereof.

BACKGROUND

With the rapid development of society and the gradual improvement of people's living standards, more and more people choose to travel by plane. For the convenience of the majority of passengers, catering services are usually provided for each passenger on a plane.

However, at present, air service personnel still push a dining car to deliver meals by hand. This conventional air delivery method has obvious defects: first, an air delivery car occupies too large space. Because a size of a cabin aisle for passengers to walk on the plane is limited, if there are passengers who need to go to bathroom during meal delivery, the cabin aisle will become very crowded, which will bring great inconvenience to passengers. Second, the air service personnel push the dining car to deliver food by hand, which is time-consuming and laborious, resulting in a waste of manpower. Moreover, the current air delivery car has only one-sided door panel, which can only be operated unilaterally, so it is extremely inconvenient to use.

SUMMARY

The present application aims to provide an unmanned food delivery device in a cabin and an application method thereof, aiming at solving the problem that at present current aviation service personnel push a dining car to deliver food by hand, so that the use process is crowded and inconvenient, inconvenient, time-consuming and labor-intensive, resulting in waste of manpower.

The present application is realized as follows: an unmanned food delivery device in the cabin comprises:

a first conveying mechanism, where the first conveying mechanism comprises a universal conveyor belt, the universal conveyor belt is driven by universal wheels to convey lunch boxes, and the universal conveyor belt is used for conveying lunch boxes between a kitchen area and a passenger area in a reciprocating manner, the universal conveyor belt located in the passenger area is located in a luggage rack bottom plate;

multiple second conveying mechanisms, respectively arranged on the luggage rack bottom plate in the passenger area, where the luggage rack bottom plate is provided with multiple feeding openings corresponding to seats at intervals, and each second conveying mechanism is respectively located at the feeding openings, and the second conveying mechanisms are connected with the first conveying mechanism and used for conveying lunch boxes on first conveying mechanism to the seats; and Optionally, the universal conveyor belt comprises:

a main conveyor belt, used for reciprocating the lunch boxes between the kitchen area and the passenger area; and diversion conveyor belts, arranged at one side of the main conveyor belt and connected with the second conveying mechanisms;

the main conveyor belt and the diversion conveyor belts are arranged in parallel and provided with multiple universal wheels; the multiple universal wheels are used for guiding lunch boxes on the main conveyor belt to the diversion conveyor belts.

Optionally, each second conveying mechanism comprises:

lunch box storage boxes for storing lunch boxes, wherein the lunch box storage boxes are provided with multiple lunch box inlets and outlets, and one of the lunch box inlets and outlets is arranged just opposite to the diversion conveyor belts; and multiple telescopic power rods, where both ends of the telescopic power rods are respectively connected with the luggage rack bottom plate and the lunch box storage boxes, and are used for driving the lunch box storage boxes to lift up and down.

Optionally, the multiple lunch box inlets and outlets comprise a first inlet and outlet, a second inlet and outlet and a third inlet and outlet, where the first inlet and outlet, the second inlet and outlet and the third inlet and outlet are respectively arranged on three side walls of the lunch box storage box, and the first inlet and outlet are arranged just opposite to the diversion conveyor belts.

Optionally, the loading and unloading mechanism comprises:

a roller conveyor belt provided with a connecting end and a discharging end, where the connecting end is connected with the universal conveyor belt;

a meal case for storing new lunch boxes, where a pushing assembly is arranged in the meal case, and the pushing assembly is used for sending the lunch boxes in the meal case to the roller conveyor belt; and a garbage can connected with the discharging end of the roller conveyor belt and used for collecting used lunch boxes.

Optionally, the roller conveyor belt comprises:

a second roller conveyor belt, where two ends of the second roller conveyor belt are a connecting end and a discharging end respectively, and a middle part of the second roller conveyor belt is separated by a fixed baffle;

a first roller conveyor belt located at a bottom of the second roller conveyor belt and spaced apart from the second roller conveyor belt, where one end of the first roller conveyor belt is a discharging end, and the other end is connected with the meal case; a middle part of the first roller conveyor belt is separated by a slidable baffle, the slidable baffle is connected with the first roller conveyor belt in a sliding way;

the first roller conveyor belt and the second roller conveyor belt are both provided with multiple rollers at intervals, and the multiple rollers are rotationally connected with the first roller conveyor belt for conveying lunch boxes;

the first roller conveyor belt and the second roller conveyor belt are connected to a connecting assembly;

the fixed baffle and the slidable baffle are located on a same vertical horizontal line.

Optionally, the connecting assembly comprises:

a lunch box elevator, located at one side of the first roller conveyor belt and the second roller conveyor belt and provided with a lifting belt; and multiple brackets, where brackets are arranged at intervals and connected with the lifting belt through bracket shafts respectively, and the brackets are arranged just opposite to the first roller conveyor belt and the second roller conveyor belt, and are used for reciprocating the lunch boxes on the first roller conveyor belt and the second roller conveyor belt.

Optionally, the pushing assembly comprises a first pushing plate, a second pushing plate and a liftable bottom plate;

the liftable bottom plate is arranged at a bottom of the meal case and used for lifting the lunch boxes upwards;

the first pushing plate is arranged at one end of the meal case far away from the first roller conveyor belt, and is used for pushing the lunch boxes towards the first roller conveyor belt;

the second pushing plate is arranged at one side far away from a joint between the meal case and the first roller conveyor belt, and is used for pushing the lunch boxes towards the joint.

The presentation further aims to provide an application method of the unmanned food delivery device, comprising:

S101: sending lunch boxes to the universal conveyor belt of the first conveying mechanism by the loading and unloading mechanism when meals need to be served;

S102: sending lunch boxes to second conveying mechanisms located at the feeding openings corresponding to seats by the universal conveyor belt;

S103: conveying lunch boxes to seats by the second conveying mechanisms, and taking the lunch boxes by passengers to complete a meal delivery process;

S104: after eating of passengers, pressing the lunch box recovery buttons on armrests of the seats, and descending the second conveying mechanisms to the seats;

S105: putting used lunch boxes on the second conveying mechanisms by passengers, and sending the used lunch boxes by the second conveying mechanisms to the universal conveyor belt of the first conveying mechanism; and S106: conveying the used lunch boxes by the universal conveyor belt of the first conveying mechanism to the loading and unloading mechanism to complete a meal receiving process.

DETAILED DESCRIPTION OF THE EMBODIMENTS

Figure 1:
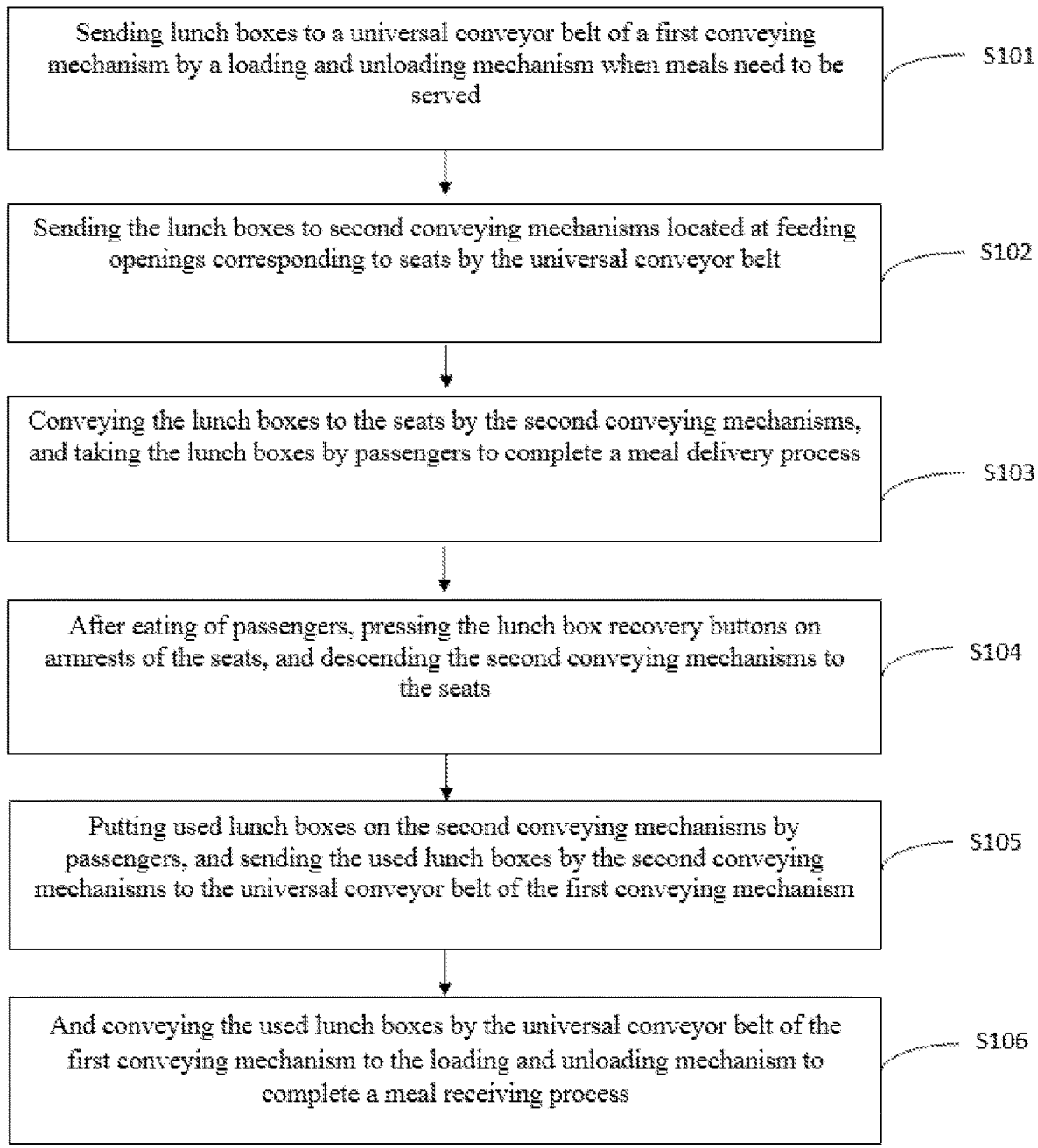
FIG. 1 is a flow chart of an application method of an unmanned food delivery device according to the present application.

In order to make objectives, technical scheme and advantages of the present application clearer, the present application will be further explained in detail with reference to the drawings and examples. It should be understood that the specific embodiments described here are only for explaining the present application, but not for limiting the present application.

The specific implementation of the present application will be described in detail with reference to the following specific examples.

As shown in FIG. 1-FIG. 4 and FIG. 6, schematic diagrams of an unmanned food delivery device in a cabin and an application method thereof in an embodiment of the present application, the unmanned food delivery device includes:

a first conveying mechanism 19, where the first conveying mechanism comprises a universal conveyor belt 2, the universal conveyor belt 2 is driven by conveying wheels 6 to convey lunch boxes 1, the universal conveyor belt 2 is used for conveying the lunch boxes 1 between a kitchen area and a passenger area in reciprocating manner and the universal conveyor belt 2 located in the passenger area is located in a luggage rack bottom plate 3;

multiple second conveying mechanisms 20 respectively arranged on the luggage rack bottom plate 3 in the passenger area, where the luggage rack bottom plate 3 is provided with multiple feeding openings 24 corresponding to seats at intervals, and each second conveying mechanism 20 is respectively located at the feeding openings 24, and the second conveying mechanisms 20 is connected with the first conveying mechanism 19 and used for conveying the lunch boxes 1 of the first conveying mechanism 19 to the seats; and the loading and unloading mechanism 23 arranged in the kitchen area and connected with the first conveying mechanism 19 for loading or unloading the first conveying mechanism 19.

In one embodiment of the application, through cooperation of the first conveying mechanism 19, the second conveying mechanisms 20 and the loading and unloading mechanism 23, when meals need to be delivered, the lunch boxes 1 can be automatically delivered to passenger's seats from a kitchen, and the lunch boxes 1 can be recycled to the kitchen after the passengers have eaten, thus playing a role of automatic meal delivery and reception, and saving space of an aisle. To solve the problem that the current air meal delivery method uses a way that air service personnel push a dining car by hand to deliver meals, so that the use process is crowded, inconvenient, time-consuming and labor-intensive, resulting in manpower waste.

Figure 2:
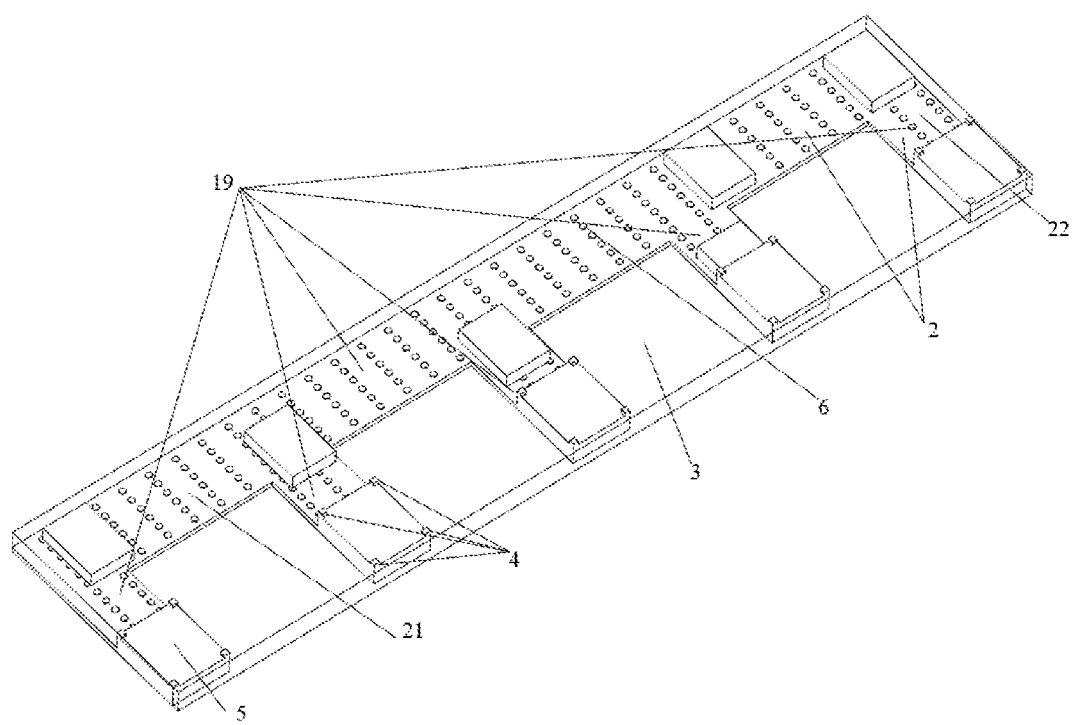
FIG. 2 is a schematic diagram of lunch box sorting and transmission of an unmanned food delivery device in a cabin according to the present application.
Figure 3:
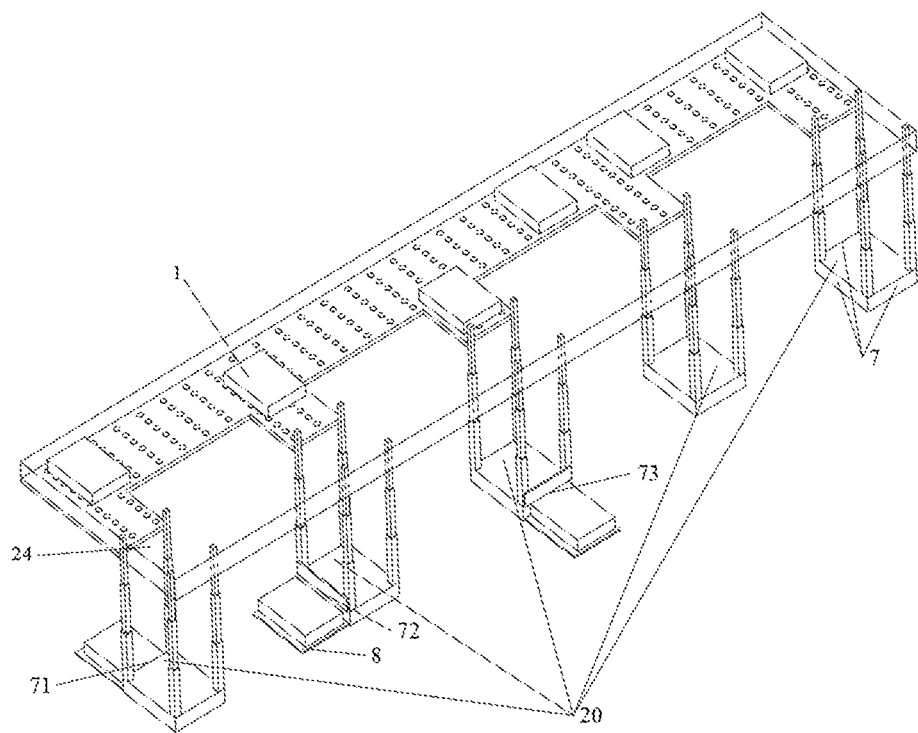
FIG. 3 is a schematic diagram of a second conveying mechanism in a food delivery state of the unmanned food delivery device in the cabin according to the present application.

As shown in FIG. 2-FIG. 3, as a preferred embodiment of the present application, the universal conveyor belt 2 includes:

a main conveyor belt 21 used for reciprocating the lunch boxes 1 between the kitchen area and the passenger area; and diversion conveyor belts 22 arranged at one side of the main conveyor belt 21 and connected with the second conveying mechanism 20.

The main conveyor belt 21 and the diversion conveyor belts 22 are arranged in parallel and provided with multiple universal wheels 6 for guiding the lunch boxes 1 on the main conveyor belt 21 to the diversion conveyor belts 22.

In one case of this embodiment, the main conveyor belt 21 is located in a thickened luggage rack bottom plate 3, and luggage racks along both sides of the cabin run through the whole cabin for sorting and conveying the lunch boxes 1; the diversion conveyor belts 22 are connected between the main conveyor belt 21 and lunch box storage boxes 5, and their number is a same as the number of rows of passenger seats on both sides of the cabin. The lunch box storage boxes 5 are used for distributing and recycling meals.

Figure 4:
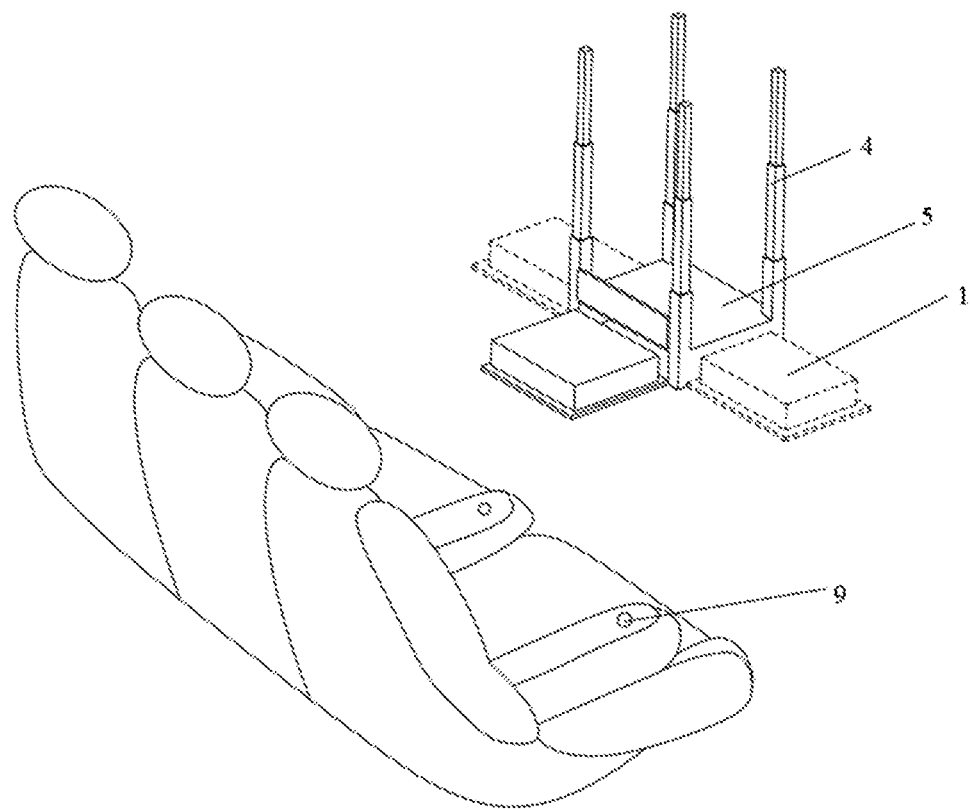
FIG. 4 is a schematic diagram of lunch box distributing and recycling of an unmanned food delivery device in the cabin according to the present application.

As shown in FIG. 2-FIG. 4, as a preferred embodiment of the present application, each second conveying mechanism 20 includes:

the lunch box storage boxes 5 for accommodating the lunch boxes 1, where the lunch box storage boxes 5 are provided with multiple lunch box inlets and outlets 7, and one of the lunch box inlets and outlets 7 is arranged just opposite to the diversion conveyor belts 22; and multiple telescopic power rods 4, both ends of which are respectively connected with the luggage rack bottom plate 3 and the lunch box storage boxes 5, are used for driving the lunch box storage boxes 5 to lift up and down.

In one case of this embodiment, the multiple lunch box inlets and outlets 7 include a first inlet and outlet 71, a second inlet and outlet 72 and a third inlet and outlet 73, which are respectively opened at three side walls of the lunch box storage boxes 5, where the first inlet and outlet 71 is located just opposite to the diversion conveyor belts 22.

In another case of this embodiment, the lunch box storage boxes 5 are equipped with telescopic power rods 4, so as to realize a vertical movement of the lunch boxes 1, and the lunch box storage boxes 5 have the first inlet and outlet 71, the second inlet and outlet 72, and the third inlet and outlet 73, which are in one-to-one correspondence with three passengers in each row. If no passengers take the lunch boxes 1 popped out of a lunch box inlet and outlet 7, a voice prompt will be given to remind the passengers to take it in time. If no one takes it, the service for the passenger will be skipped and the specific information will be fed back to the information management cloud platform. At this time, aviation service personnel are required to do further processing.

Optionally, the lunch box storage boxes 5 are equipped with infrared detectors for sensing obstacles, so as to avoid accidents such as collision with people when the lunch box storage boxes 5 deliver food.

Specifically, a bottom plate 8 of the lunch box storage box 5 at a bottom of the lunch box storage box 5 is provided with a weight sensor for detecting a specific state of the lunch box storage box 5.

Specifically, lunch box recovery buttons 9 are arranged on armrests of the passenger seats. When the passengers finish eating, the lunch box storage boxes 5 will descend to an appropriate height again by pressing the lunch box recovery buttons 9 on the armrests of the passenger seats. The passengers only need to place the lunch boxes 1 in the lunch box storage boxes 5, and then the lunch box storage boxes 5 will return along an original course.

Figure 5:
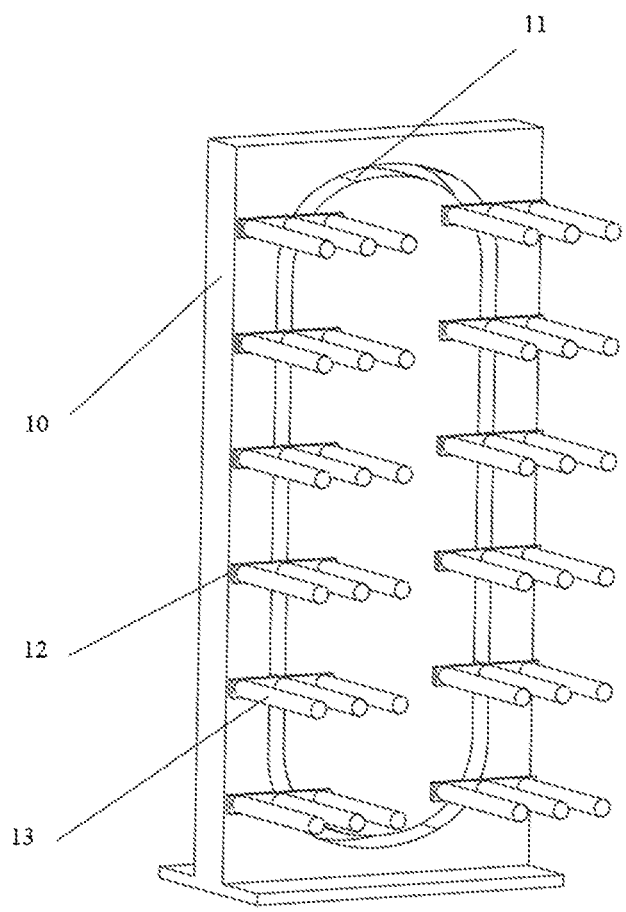
FIG. 5 is a schematic diagram of a lunch box elevator of an unmanned food delivery device in the cabin according to the present application.
Figure 6:
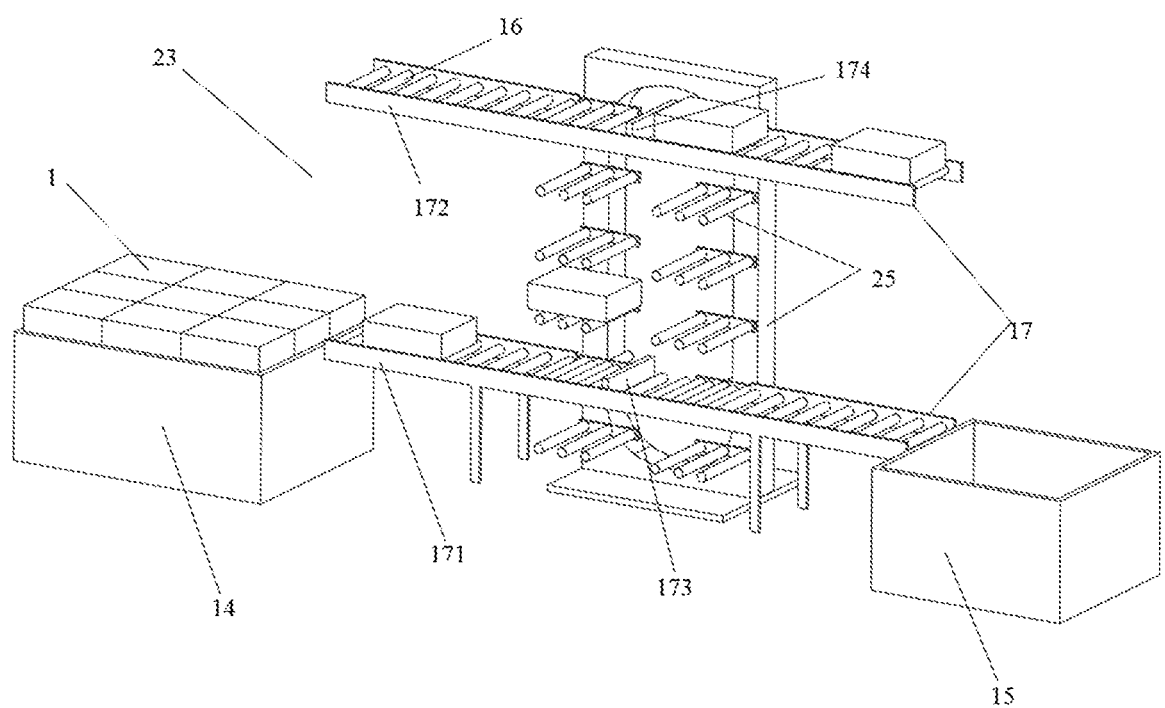
FIG. 6 is a schematic diagram of a loading and unloading mechanism of an unmanned food delivery device in the cabin according to the present application.
Figure 7:
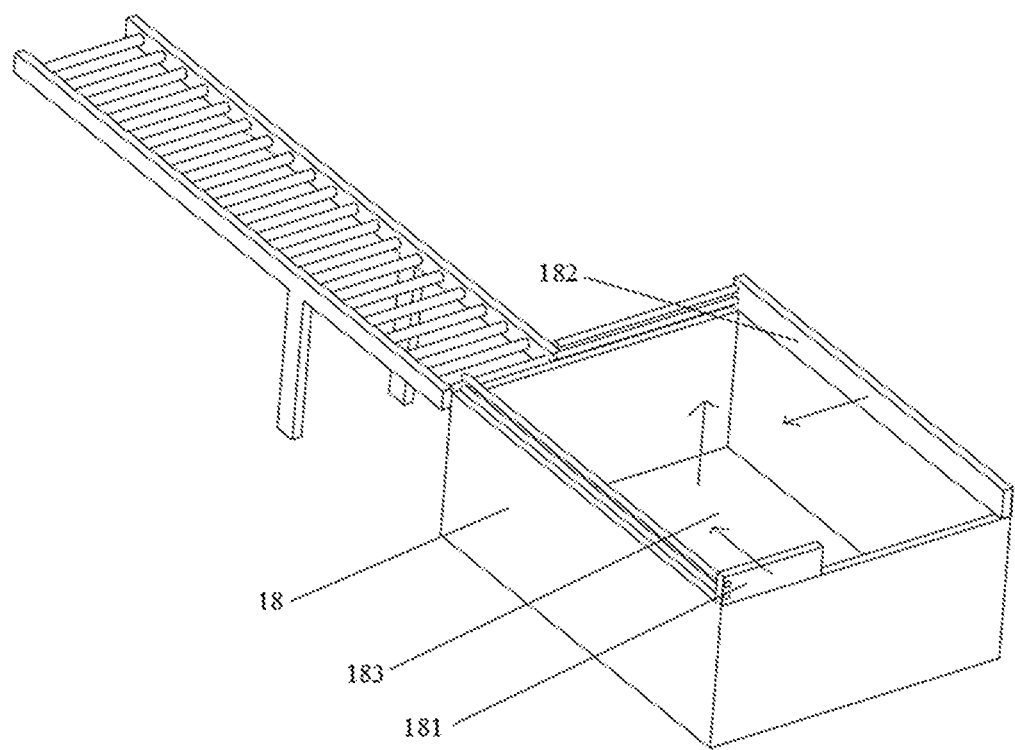
FIG. 7 is a schematic diagram of a pushing assembly of an unmanned food delivery device in the cabin according to the present application.
Figure 8:
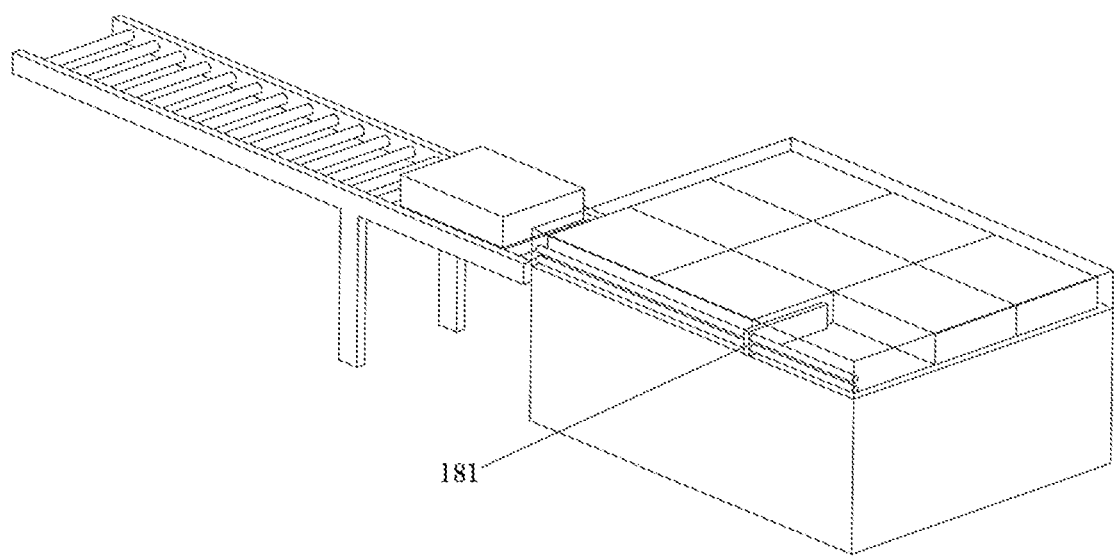
FIG. 8 shows a schematic diagram of a first pushing plate in FIG. 7 pushing a lunch box.
Figure 9:
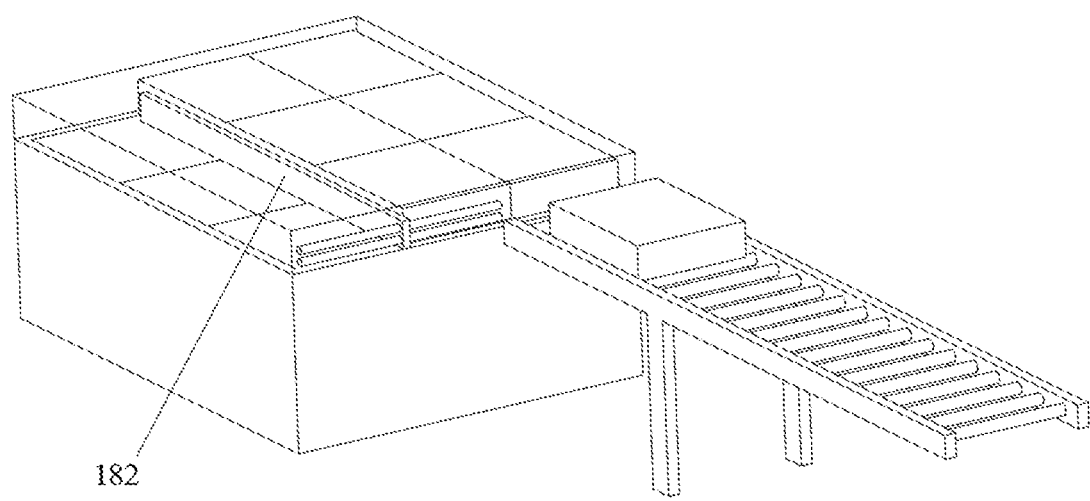
FIG. 9 is a schematic diagram of a second pushing plate in FIG. 7 pushing a lunch box.

As shown in FIG. 5-FIG. 6, as a preferred embodiment of the present application, the loading and unloading mechanism includes:

a roller conveyor belt 17 provided with a connecting end and a discharging end, where the connecting end is connected with the universal conveyor belt 2;

a meal case 14 for storing new lunch boxes 1, where a pushing assembly 18 is arranged in the meal case 14, and the pushing assembly is used for sending the lunch boxes 1 in the meal case 14 to the roller conveyor belt 17; and a garbage can 15 connected with the discharging end of the roller conveyor belt 17 and used for collecting used lunch boxes 1.

In one case of this embodiment, the roller conveyor belt 17 includes:

a second roller conveyor belt 172, where two ends of the second roller conveyor belt 172 are a connecting end and a discharging end respectively, and a middle of the second roller conveyor belt 172 is separated by a fixed baffle 174;

a first roller conveyor belt 171 located at a bottom of the second roller conveyor belt 172 and spaced apart from the second roller conveyor belt 172, where one end of the first roller conveyor belt 171 is a discharging end, and the other end is connected with the meal case 14, and a middle of the first roller conveyor belt 171 is separated by a slidable baffle 173 which is slidably connected with the first roller conveyor belt 171.

The first roller conveyor belt 171 and the second roller conveyor belt 172 are provided with multiple rollers 16 at intervals, and the multiple rollers 16 are rotatably connected with the first roller conveyor belt 171 for conveying the lunch boxes 1.

The first roller conveyor belt 171 and the second roller conveyor belt 172 are connected to a connecting assembly 25.

The fixed baffle 174 and the slidable baffle 173 are located on a same vertical horizontal line.

In an aspect of this embodiment, the connecting assembly 25 includes:

a lunch box elevator 10 located at one side of the first roller conveyor belt 171 and the second roller conveyor belt 172, and provided with a lifting belt 11; and multiple brackets 13 arranged at intervals and connected with the lifting belt 11 through bracket shafts 12 respectively, where the brackets 13 are arranged opposite to the first roller conveyor belt 171 and the second roller conveyor belt 172, and are used for reciprocating the lunch boxes 1 on the first roller conveyor belt 171 and the second roller conveyor belt 172.

In another case of this embodiment, when meals need to be served, the pushing assembly 18 is used to push the lunch boxes 1 from the meal case 14 to the first roller conveyor belt 171 one by one. The roller conveyor belt 17 comprises the first roller conveyor belt 171 and the second roller conveyor belt 172, which are used for vertically lifting lunch boxes in a vertical direction with the lunch box elevator 10. The first roller conveyor belt 171 and the second roller conveyor belt 172 are provided with the slidable baffle 173 and the fixed baffle 174, which are used for blocking lunch boxes, so that the lunch box elevator 10 works more stably. The pushing assembly 18, the roller conveyor belt 17 and the lunch box elevator 10 are located in the kitchen area of the cabin.

Specifically, when meals need to be served, the lunch box elevator 10 rotates clockwise, while when the lunch boxes 1 are collected, the lunch box elevator 10 rotates counterclockwise, and the slidable baffle 173 needs to be removed.

As shown in FIG. 6-FIG. 9, as a preferred embodiment of the present application, the pushing assembly includes a first pushing plate 181, a second pushing plate 182 and a liftable bottom plate 183.

The liftable bottom plate 183 is arranged at bottom inside the meal case 14, and is used for lifting the lunch boxes 1 upward.

The first pushing plate 181 is arranged at one end of the lunch box 14 away from the first roller conveyor belt 171, and is used to push the lunch boxes 1 toward the first roller conveyor belt 171.

The second pushing plate 182 is arranged at one side far away from a joint between the meal case 14 and the first roller conveyor belt 171, and is used for pushing the lunch boxes towards the joint.

In one case of this embodiment, the pushing assembly 18 is provided with the first pushing plate 181, the second pushing plate 182, and the liftable bottom plate 183, which are respectively used for pushing the lunch boxes in front and back, left and right, and up and down directions.

As shown in FIG. 1, an embodiment of the present application also provides an application method of the unmanned food delivery device. The application method comprises:

S101: sending lunch boxes to a universal conveyor belt of a first conveying mechanism by a loading and unloading mechanism when meals need to be served;

S102: sending the lunch boxes to second conveying mechanisms located at feeding openings corresponding to seats by the universal conveyor belt;

S103: conveying the lunch boxes to the seats by the second conveying mechanisms, and taking the lunch boxes by passengers to complete a meal delivery process;

S104: after eating of passengers, pressing the lunch box recovery buttons on armrests of the seats, and descending the second conveying mechanisms to the seats;

S105: putting used lunch boxes on the second conveying mechanisms by passengers, and sending the used lunch boxes by the second conveying mechanisms to the universal conveyor belt of the first conveying mechanism; and S106: conveying the used lunch boxes by the universal conveyor belt of the first conveying mechanism to the loading and unloading mechanism to complete a meal receiving process.

The present application provides the unmanned food delivery method in the cabin with embedded conveyor belts, and ordinary technicians in the industry can also take other steps to implement it. The flow chart shown in FIG. 1 is just a specific embodiment.

To sum up, the above is only preferred embodiments of the present application, and it is not intended to limit the present application. Any modification, equivalent substitution and improvement made within the spirit and principle of the present application should be included in the scope of protection of the present application.

What is claimed is:

1. An unmanned food delivery device in a cabin, comprising:
    a universal conveyor, wherein the universal conveyor is driven by universal wheels to convey lunch boxes, and the universal conveyor is used for conveying the lunch boxes in a kitchen area and a passenger area in a reciprocating manner, the universal conveyor located in the passenger area is located in a luggage rack bottom plate;
    a plurality of lift devices, respectively arranged on the luggage rack bottom plate in the passenger area, wherein the luggage rack bottom plate is provided with a plurality of feeding openings corresponding to seats at intervals, lift devices are respectively located at the feeding openings, and the lift devices are connected with the universal conveyor and used for conveying lunch boxes on the universal conveyor to the seats; and
    a loading and unloading mechanism, arranged in the kitchen area and connected with the universal conveyor for loading or unloading the universal conveyor;
    wherein the universal conveyor comprises:
        a main conveyor, used for reciprocating the lunch boxes in the kitchen area and the passenger area; and
        diversion conveyors, arranged at one side of the main conveyor and connected with the lift devices,
        wherein the diversion conveyors are arranged in parallel and perpendicular to the main conveyor, the main conveyor and the diversion conveyors are provided with a plurality of universal wheels; and the plurality of universal wheels are used for guiding the lunch boxes on the main conveyor to the diversion conveyors;
    wherein the lift devices comprise:
        lunch box storage boxes for storing the lunch boxes, wherein each of the lunch box storage boxes is provided with a plurality of lunch box inlet-and-outlet openings, and one of the lunch box inlet-and-outlet openings is arranged just opposite to the main conveyor; and
        a plurality of telescopic power rods, wherein both ends of the telescopic power rods are respectively connected with the luggage rack bottom plate and the lunch box storage boxes, and are used for driving the lunch box storage boxes to lift up and down;
    wherein the plurality of lunch box inlet-and-outlet openings comprise a first inlet and outlet opening, a second inlet and outlet opening and a third inlet and outlet opening, wherein the first inlet and outlet opening, the second inlet and outlet opening and the third inlet and outlet opening are respectively arranged on three side walls of the lunch box storage box, and the first inlet and outlet opening is arranged opposite to the main conveyor; and the first inlet and outlet opening, the second inlet and outlet opening and the third inlet and outlet opening are in one-to-one correspondence with three passengers in each row and configured to pop out the lunch boxes;
    wherein the loading and unloading mechanism comprises:
        a roller conveyor provided with a connecting end and a discharging end, wherein the connecting end is connected with the universal conveyor;
        a meal case for storing new lunch boxes, wherein a pushing assembly is arranged in the meal case, and the pushing assembly is used for sending the lunch boxes in the meal case to the roller conveyor; and
        a garbage can connected with the discharging end of the roller conveyor and used for collecting used lunch boxes.

2. The unmanned food delivery device according to claim 1, wherein the roller conveyor comprises:
    a controller, a first roller conveyor and a second roller conveyor located at a top of the first roller conveyor and spaced apart from the first roller conveyor, wherein two ends of the second roller conveyor are a connecting end and a discharging end respectively, and a middle part of the second roller conveyor is separated by a fixed baffle; and
    wherein one end of the first roller conveyor is a discharging end, and another end of the first roller conveyor is connected with the meal case; a middle part of the first roller conveyor is separated by a slidable baffle, and the slidable baffle is connected with the first roller conveyor in a sliding way;

the first roller conveyor and the second roller conveyor are both provided with a plurality of rollers at intervals, and the plurality of rollers are rotationally connected with the first roller conveyor for conveying lunch boxes, and the controller is configured to drive the rollers of the first roller conveyor and the second roller conveyor to rotate;

the first roller conveyor and the second roller conveyor are connected to a connecting assembly; and the fixed baffle and the slidable baffle are located on a same vertical horizontal line;

wherein the connecting assembly comprises:
- a lunch box elevator, wherein the lunch box elevator is located at one side of the first roller conveyor and the second roller conveyor, and is provided with a lifting belt; and
- a plurality of brackets, wherein brackets are arranged at intervals and connected with the lifting belt through bracket shafts respectively, and the brackets are arranged just opposite to the first roller conveyor and the second roller conveyor, and are used for reciprocating the lunch boxes on the first roller conveyor and the second roller conveyor.

3. The unmanned food delivery device according to claim 2, wherein the pushing assembly comprises a first pushing plate, a second pushing plate and a liftable bottom plate;

the liftable bottom plate is arranged at a bottom of the meal case and used for lifting the lunch boxes upwards;

the first pushing plate is arranged at one end of the meal case far away from the first roller conveyor, and is used for pushing the lunch boxes towards the first roller conveyor; and the second pushing plate is arranged at one side far away from a joint between the meal case and the first roller conveyor, and is used for pushing the lunch boxes towards the joint.

4. An application method of an unmanned food delivery device according to claim 1, comprising:
- S101: sending the lunch boxes to the universal conveyor by the loading and unloading mechanism when meals need to be served;
- S102: sending the lunch boxes to the lift devices located at the feeding openings corresponding to the seats by the universal conveyor;
- S103: conveying the lunch boxes to the seats by the lift devices, and taking the lunch boxes by the passengers to complete a meal delivery process;
- S104: after the passengers finish eating, pressing lunch box recovery buttons on armrests of the seats, and descending the lift devices to the seats;
- S105: putting used lunch boxes on the lift devices by the passengers, and sending the used lunch boxes by the lift devices to the universal conveyor; and
- S106: conveying the used lunch boxes by the universal conveyor to the loading and unloading mechanism to complete a meal receiving process.

* * * * *